(12) United States Patent
Sauk

(10) Patent No.: US 8,480,021 B1
(45) Date of Patent: Jul. 9, 2013

(54) ICE FISHING REEL

(76) Inventor: Steven A. Sauk, Columbia Heights, MN (US)

( * ) Notice: Subject to any disclaimer, the term of this patent is extended or adjusted under 35 U.S.C. 154(b) by 0 days.

(21) Appl. No.: 13/452,127

(22) Filed: Apr. 20, 2012

(51) Int. Cl.
*A01K 89/01* (2006.01)

(52) U.S. Cl.
USPC ........... 242/317; 242/318; 242/310; 242/322; 242/302

(58) Field of Classification Search
USPC ................. 242/317, 318, 310, 311, 322, 287, 242/302, 291
See application file for complete search history.

(56) References Cited

U.S. PATENT DOCUMENTS

| | | | | |
|---|---|---|---|---|
| 3,784,124 A * | 1/1974 | Shumate et al. | ............... | 242/297 |
| 4,352,474 A * | 10/1982 | Kovalovsky | ................. | 242/265 |
| 4,461,435 A * | 7/1984 | Kovalovsky | ................. | 242/258 |
| 4,728,054 A * | 3/1988 | Pisapio | ......................... | 242/258 |
| 5,556,049 A * | 9/1996 | Bennett et al. | ................ | 242/295 |
| 5,590,847 A * | 1/1997 | Ament | .......................... | 242/317 |
| 5,626,303 A * | 5/1997 | Bringsen | ....................... | 242/265 |
| 6,851,637 B2 * | 2/2005 | Gilmore | ........................ | 242/318 |
| 7,306,179 B2 * | 12/2007 | Venes | ........................... | 242/322 |
| 7,360,732 B1 * | 4/2008 | Byl | ................................ | 242/223 |
| 7,374,121 B2 * | 5/2008 | Morise | ......................... | 242/318 |
| 8,308,097 B2 * | 11/2012 | Hyun | ............................ | 242/296 |
| 2007/0176036 A1 * | 8/2007 | Venes | ........................... | 242/322 |

* cited by examiner

*Primary Examiner* — Emmanuel M Marcelo
(74) *Attorney, Agent, or Firm* — Dave Alan Lingbeck

(57) ABSTRACT

An ice fishing reel for facilitating automatic tension to the fishing line. The ice fishing reel includes a support assembly including a support member, a rod holder being in communication with the support member, and a shaft extending from the support member to support a spool; a handle assembly being in communication with the spool and the support assembly; and a spool tension assembly being supported upon the shaft and being biasedly engagable to the spool.

2 Claims, 2 Drawing Sheets

ICE FISHING REEL

BACKGROUND OF THE INVENTION

1. Field of the Invention

The present invention relates to fishing reels and more particularly pertains to a new ice fishing reel for facilitating automatic tension to the fishing line.

2. Description of the Prior Art

The use of fishing reels is known in the prior art. More specifically, fishing reels heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a spool engaging plate having a hole, a disc-shaped plate sandwiching a line receiving spool. Another prior art includes a flange plate, a cartridge spool and a locking member for locking the cartridge spool to the flange plate. Also another prior art includes a reel body with a reversible pawl and an arbor with a spindle shaft with a gear rotates on the arbor, and further a spool and a drive plate rotate on the spindle shaft with a drag capsule to adjustably put drag on the spool. Further, another prior art includes a housing having an open side, a spool rotatably disposed in the housing, a cover to enclose the spool inside the housing, and a handle having a shaft portion disposed through the housing, spool and cover. Yet, another prior art includes a fly reel having a drag apparatus which includes a drag knob which is engaged to an outer side of the center shaft, a drag spindle which is spaced from the drag knob, a braking member which limits rotation of the drag spindle, compression rings and drag washers. While these devices fulfill their respective, particular objectives and requirements, the aforementioned patents do not disclose a new ice fishing reel.

SUMMARY OF THE INVENTION

The general purpose of the present invention, which will be described subsequently in greater detail, is to provide a new ice fishing reel which has many of the advantages of the fishing reels mentioned heretofore and many novel features that result in a new ice fishing reel which is not anticipated, rendered obvious, suggested, or even implied by any of the prior art fishing reels, either alone or in any combination thereof. The present invention includes a support assembly including a support member, a rod holder being in communication with the support member, and a shaft extending from the support member to support a spool; a handle assembly being in communication with the spool and the support assembly; and a spool tension assembly being supported upon the shaft and being biasedly engagable to the spool. None of the prior art includes the combination of the elements of the present invention.

There has thus been outlined, rather broadly, the more important features of the ice fishing reel in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new ice fishing reel which has many of the advantages of the fishing reels mentioned heretofore and many novel features that result in a new ice fishing reel which is not anticipated, rendered obvious, suggested, or even implied by any of the prior art fishing reels, either alone or in any combination thereof.

Still another object of the present invention is to provide a new ice fishing reel for facilitating automatic tension to the fishing line without user intervention.

Still yet another object of the present invention is to provide a new ice fishing reel that is compact and lightweight and has fewer parts than other reels.

Even still another object of the present invention is to provide a new ice fishing reel that can be assembled easily and removes any slack in the fishing line so that a user can more easily feel if a fish is nibbling at the hook.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
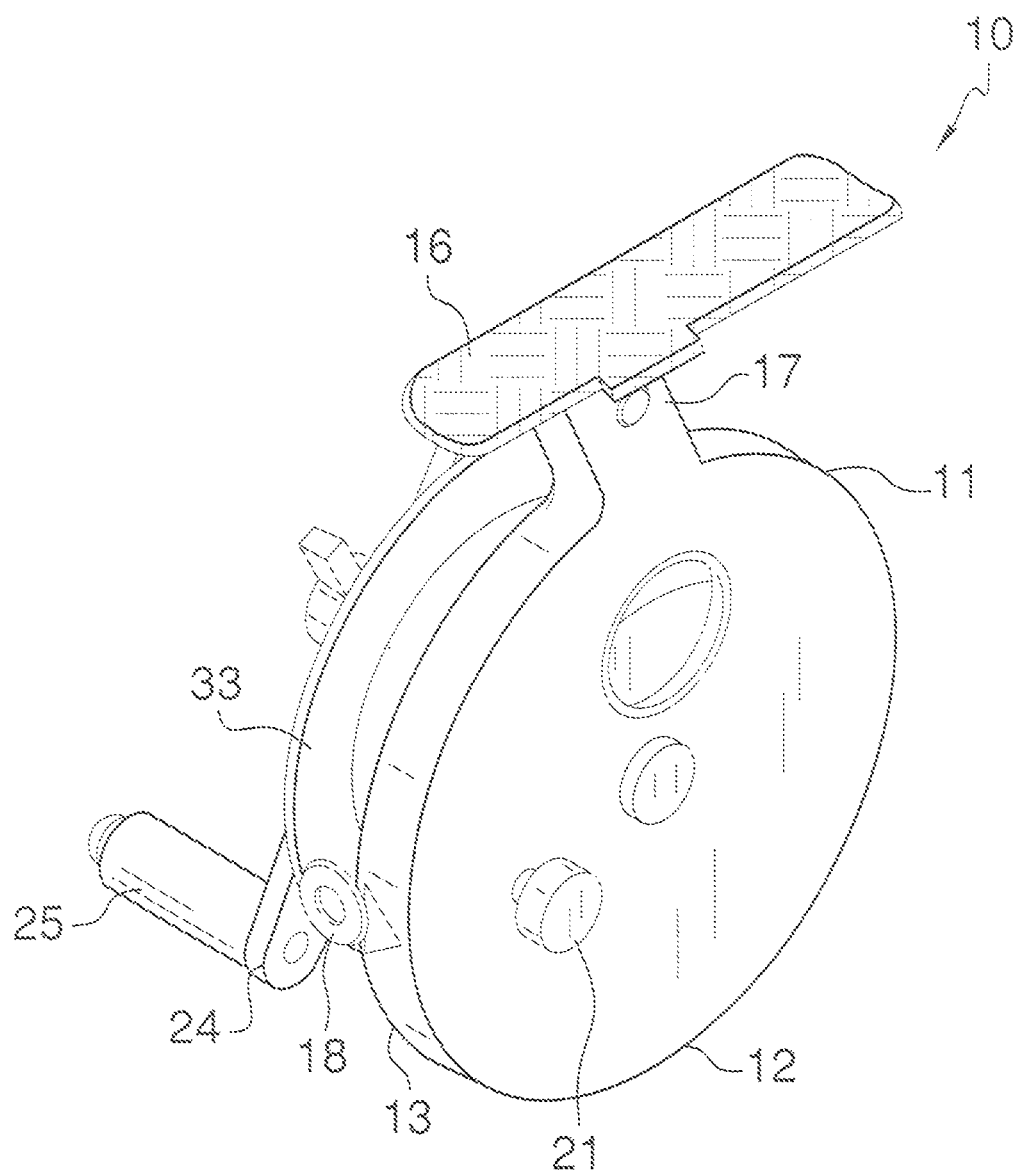
FIG. 1 is a rear perspective view of a new ice fishing reel according to the present invention.
Figure 2:
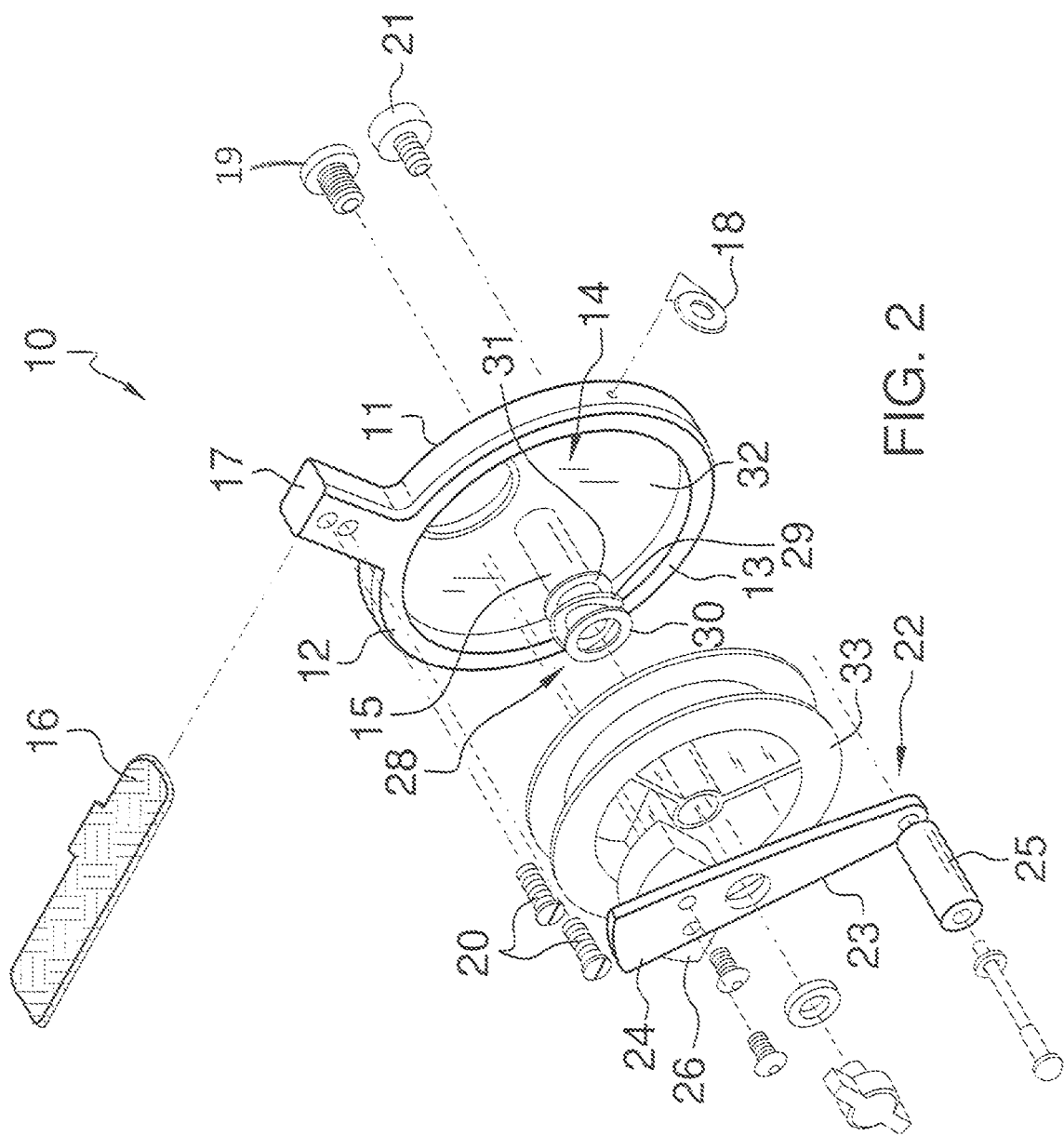
FIG. 2 is a front exploded perspective view of the present invention.

With reference now to the drawings, and in particular to FIGS. 1 through 2 thereof, a new ice fishing reel embodying the principles and concepts of the present invention and generally designated by the reference numeral 10 will be described.

As best illustrated in FIGS. 1 through 2, the ice fishing reel generally comprises a support assembly 11 including a support member 12, a rod holder 16 being in conventional communication with the support member 12, and a shaft 15 being conventionally fastened with a fastener 19 to and extending from the support member 12 to support a spool 33. A handle assembly 22 is in conventional communication with the spool 33 and the support assembly 11. A spool tension assembly is conventionally supported upon the shaft 15 and is biasedly engagable to the spool 33.

The support member 12 includes a plate 32 having a rim 13 being disposed about a circumference thereof and extending outwardly from a front surface of the plate 32 thus forming a recessed area 14 for receiving the spool 33. The support member 12 also includes a rod holder support 17 integrally extending from a circumference of the plate 32 and lying in a plane of the plate 32 with the rod holder 16 being fastened with fastener members 20 to the holder support. The support assembly 11 further includes a spool lock 21 being communicable with the plate 32 and the spool 33, and also includes a line guide member 18 being conventionally attached to the support member 12 and in particular to the rim 13. The spool lock 21 is a screw which is threadable through the plate and is engagable to the spool 33.

The handle assembly 22 includes a handle 23 being fastened with a wing screw to the shaft 15 and also includes a spool engagement member 26 being conventionally fastened to the handle 23 and being removably disposed in and engaged to the spool 33 for rotating the spool 33. The handle 23 includes an elongate planar member 24 being fastened to the shaft 15 and also includes a knob being fastened to the elongate planar member 24 near a distal end thereof. The spool engagement member 26 is a block being fastened to the elongate planar member 24 near a proximate end thereof and being dimensioned to fit between and engage spokes and rim 13 of the spool 33. The block is essentially trapezoidal-shaped with the longer side being arcuate so that it matches up with the arcuate rim of the spool 33.

The spool tension assembly 28 includes a biased element 29 being disposed upon the shaft 15 to restrict movement of the spool 33. The spool tension assembly 28 also includes two washers 30,31 being disposed upon the shaft 15 and being engaged to the biased element 29 and being biasedly engagable to the spool 33 and to the support member 12. The biased element 29 includes a bevel washer, and the two washers 30,31 include first and second flat washers 30,31 with the bevel washer 29 being sandwiched therebetween and being disposed about the shaft 15. The first flat washer 30 is engagable to the spool 33 and the second flat washer 31 is engagable to the support member 12.

In use, the user positions the fishing rod over an open hole in the ice and lowers the fishing line from the spool 33 by turning the spool 33 clockwise using the handle 23. Once the fishing line is lowered to the desired depth into the water, the biased element 29 engages the two washers 30,31 automatically against the spool 33 and the support member 12 to restrict any movement of the spool 33 and to apply tension to the fishing line in cooperation with the bait, sinkers, and hook on the end of the fishing line. With the fishing line being substantially taut, the user is able to feel the fishing line move upon a fish striking it and can react quickly by jerking the fishing pole to catch the fish. Without the spool tension assembly 28, the fishing line would hang loosely and the user wouldn't be able to feel the fish hit the fishing line.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the ice fishing reel. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ice fishing reel comprising:
   a support assembly including a support member, a shaft extending from said support member to support a spool, wherein said support member includes a plate, wherein said support assembly further includes a spool anti-movement member, and also includes a line guide member being attached to said support member, wherein said spool anti-movement member is a screw which is threadable through said plate and is adapted to be engagable to the spool;
   a handle assembly being in operable communication with said support assembly; and
   a spool tension assembly being supported upon said shaft.

2. An ice fishing reel comprising:
   a support assembly including a support member and a shaft extending from said support member to support a spool;
   a handle assembly adapted to be in operable communication with the spool and also being in operable communication with said support assembly, wherein said handle assembly includes a handle fastened to said shaft and also includes a spool engagement member attached to said handle and adapted to be removably disposed in and engaged to the spool for rotating the spool, wherein said handle includes an elongate planar member being fastened to said shaft and also includes a knob being fastened to said elongate planar member, wherein said spool engagement member is a block being attached to said elongate planar member and being sized to fit between and engage spokes and rim of the spool; and
   a spool tension assembly being supported upon said shaft.

\* \* \* \* \*